April 3, 1945.   C. G. STAELIN   2,373,082
APPARATUS FOR APPLYING MATS TO BATTERY PLATES
Filed June 18, 1942   3 Sheets-Sheet 1

Inventor
Carl G. Staelin
By John H. Overman
Attorney

April 3, 1945. C. G. STAELIN 2,373,082
APPARATUS FOR APPLYING MATS TO BATTERY PLATES
Filed June 18, 1942 3 Sheets-Sheet 2

Inventor
Carl G. Staelin
By John H. Overman
Attorney

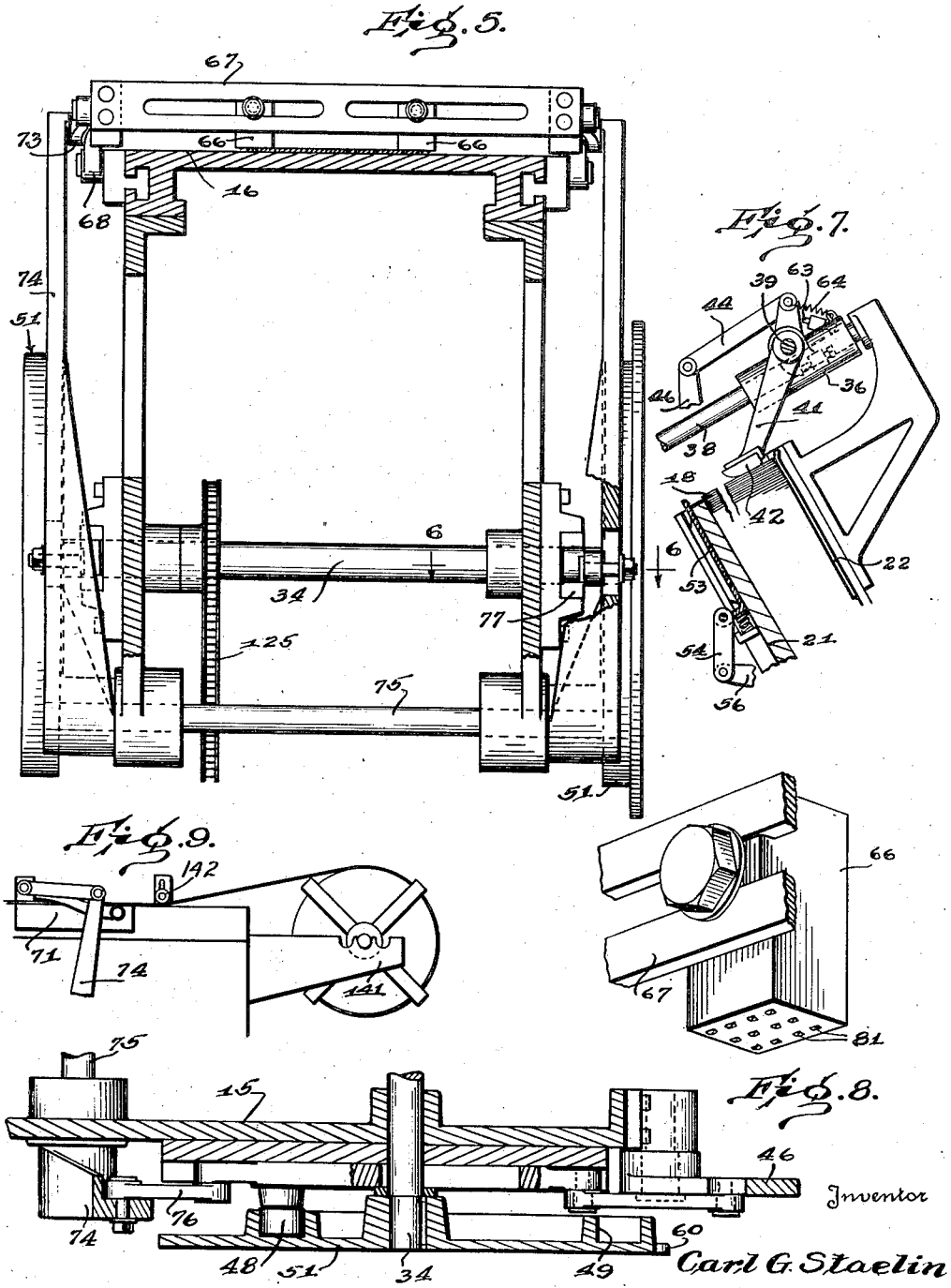

Patented Apr. 3, 1945

2,373,082

UNITED STATES PATENT OFFICE 2,373,082

APPARATUS FOR APPLYING MATS TO BATTERY PLATES

Carl G. Staelin, Ottawa Hills, Ohio, assignor to Owens-Corning Fiberglas Corporation, a corporation of Delaware Application June 18, 1942, Serial No. 447,598

4 Claims. (Cl. 154—41)

This invention relates to the application of fibrous mats or sheets to battery plates in the production of electrical storage batteries. More particularly, it provides improved apparatus for applying matted fibrous glass or other material in sheets to opposite faces of storage battery plates.

It has been the practice for a number of years past to incorporate matted fibrous glass sheets in storage battery construction. The mats are placed between the plates of the battery to cover the positive plates and maintain the active material in place while permitting free circulation of the electrolyte. This is disclosed in the Waddell Reissue Patent No. 16,548 of February 8, 1927.

More recently the fibrous glass mats have been provided in double size, that is, of a size corresponding substantially to twice the area of the face of the plate. The double mats have been applied to the plates after assembly in the cell by folding the double mat along a central line and slipping the folded mat over the plate in the cell. In some instances the double mat was perforated or creased along the fold line to aid doubling the sheet during application. This manner of applying mats to battery plates is disclosed in the Hilger and Macholl Patent No. 2,279,317 dated April 14, 1942.

In still another method of applying the fibrous glass mats, the cells were built up by interleaving the mats with the required number of plates in a stack. This stack of plates and mats was then connected together in usual manner to form the cell unit.

In all of the above procedures considerable hand operation was needed to arrange the mats in place over the faces of the plate and they were, therefore, costly and time consuming.

It is an object of the present invention to apply the fibrous mats to the battery plates as a step in their production in such a manner that the mat is securely held to the plate so that the covered plate may be subjected to the further ordinary processing operations.

It is a further object of the present invention to automatically apply the mats to both faces of the plate without hand operations.

It is a further object to adapt the mat applying procedure to tie in with the preceding plate processing operations so that the present apparatus may be arranged to receive the plates from apparatus performing the preceding operations.

It is a further object to provide simple and efficient means for quickly and securely fixing the mats to the plate and improved feeding means operating in timed relation with the mat applying means to feed the mats to the applying station.

In the drawings:

Figure 5 is an enlarged vertical cross-sectional view taken on the line 5—5 of Figure 1;

Figure 6 is a horizontal cross-sectional view taken in the plane of the line 6—6 of Figure 5;

Figure 7 is a vertical longitudinal sectional view taken on the line 7—7 of Figure 2;

Figure 8 is a perspective detailed view of one of the grippers and the mounting means therefor; and Figure 9 is a diagrammatic view illustrating a modified feeding mechanism.

Figure 1:
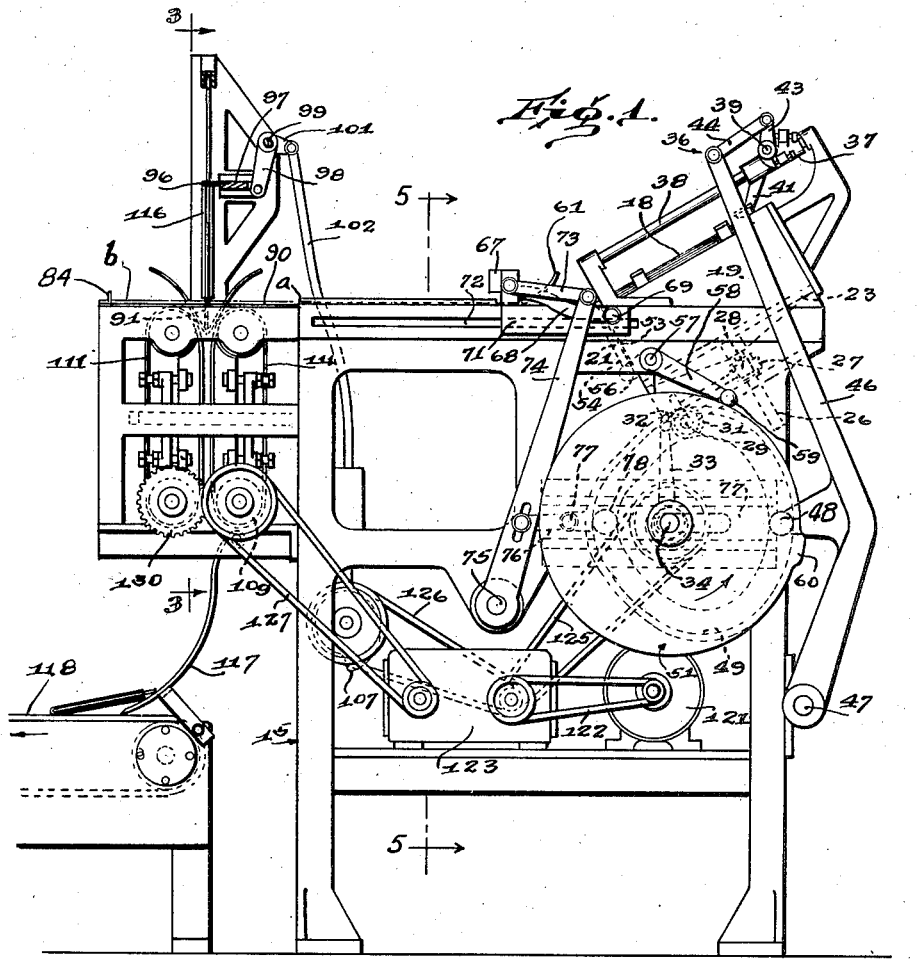
Figure 1 is a side elevational view of the apparatus of the present invention partially broken away and partly in section.
Figure 2:
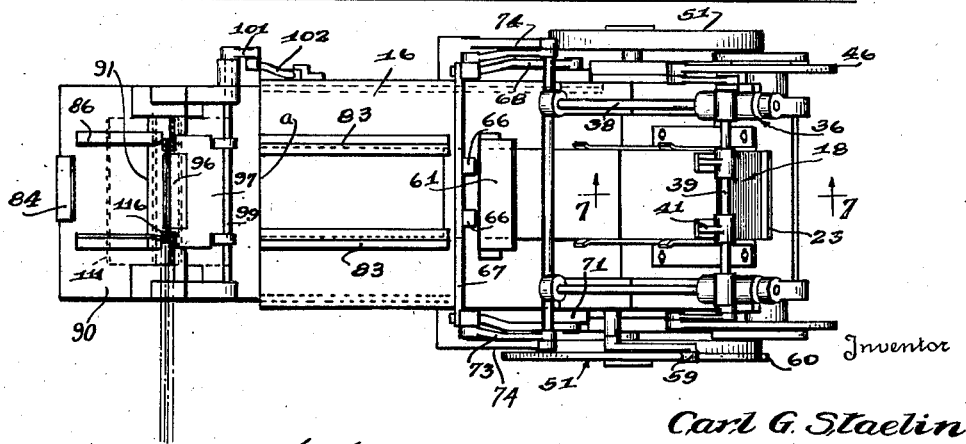
Figure 2 is a plan view of the same.

The present invention provides apparatus for automatically applying fibrous glass or other mats to battery plates, comprising feeding mechanism for removing one mat at a time from a supply of such mats and transferring the mat to an application station; means for feeding battery plates to the applying station; means for registering the fed sheet with relation to the battery plate position at the applying station; and a simple and efficient arrangement to apply the mat to the plate. All of the operations are performed automatically in a rapid sequence without handling or manual control so that the application of the mats to the plates is greatly facilitated and the time and cost entailed in applying the mats is greatly reduced.

Further, by means of the present invention the mat is securely fixed to the plate so that the covered plate may be subjected to further operations, such as baking and assembly, much in the same manner as the plate alone.

In the presently disclosed preferred embodiment of the invention, the mat applying mechanism is mounted on a frame 15 formed as a table having a plane top surface 16. The mats to be applied to the battery plates are arranged in a stack, illustrated at 18, received within an enclosure formed by side walls 19, a front end wall 21 and a rear wall 22. The bottom 23 of the enclosure for the stack is arranged to be fed upwardly as the mats are fed from the top of the stack so that as the top sheet is removed from the stack the next uppermost sheet on the stack is brought to the plane of the removed sheet to be located above the upper edge of the front wall 21.

The means for feeding the bottom plate upwardly may be of any suitable character and is illustrated herein as comprising screws 26 located at opposite sides of the bottom plate and held against rotation by being fixed to the bottom plate. Worm wheels 27 have threaded engagement with the screws and are rotatably supported by the frame. Worms 28 mesh with the worm wheels and are driven in consonance with the feeding mechanism by being suitably geared to a cross shaft 29 having a ratchet wheel 31 fixed thereon within the walls of the frame. A pawl 32 carried by a lever journaled on the cross shaft 29 engages the teeth of the ratchet 31. The outer end of the lever for the pawl has pivotal connection with one end of a link 33 eccentrically journaled at its opposite end on a cam fixed to a cross shaft 34 journaled in the frame and driven in the manner hereinafter described.

The means for feeding the sheets from the stack comprises a carriage 36 having bearings 37 slidably mounted on rods 38 supported by the frame. A cross shaft 39 is rotatably journaled on the carriage and has arms 41 fixed thereto. The outer ends of the arms are provided with rubber pads 42 that engage the upper surface of the top mat of the stack.

Means for moving the carriage and thereby feeding the mats from the stack comprises arms 43 fixed to the cross shaft 39 and extending from the shaft in the direction opposite to the direction of the arms 41. The outer ends of the arms 43 are connected by means of links 44 with the upper ends of levers 46 provided at opposite sides of the frame and fixed to a cross shaft 47 journaled in the frame. Cam rollers 48 mounted on the levers 46 intermediate the ends thereof engage cam slots 49 in cam wheels 51 fixed to opposite ends of the shaft 34 so that upon rotation of the cam wheels the levers 46 are swung on their pivots.

Means are provided cooperating with the feeding carriage 36 to release the top mat from the stock and to prevent the feeding of more than one mat at a time. A trip bar 53 (Figure 7) is slidably mounted in the frame and spring pressed upwardly to extend above the upper edge of the front wall 21 of the stack enclosure. The trip bar is connected by links 54 with the ends of levers 56 fixed to a cross shaft 57 journaled in the frame. One end of the cross shaft has fixed thereto a lever 58 carrying a roller 59 which rides on the outer periphery of the cam wheel 51. A cam 60 is provided on the cam wheel in the path of the roller 59 to lower the trip bar at the desired time.

Upon rotation of the cam wheels 51 the levers 46 are moved toward the left in Figure 1 to urge the mat engaging pads on the arms 41 into engagement with the top mat on the stack. Continued movement of the levers 46 moves the carriage 36 in the feeding direction and causes the advance end of the top mat to move over the upper edge of the front wall 21 and into engagement with the trip bar 53. Further movement of the carriage and the arm 41 causes the front portion of the top mat to bulge up as the mat engaging pad approaches the trip bar, thereby aiding to separate the top mat from the one therebeneath. As the carriage approaches the end of its movement, the cam 60 engages the roller 59 to lower the trip bar and release the forward end of the top mat to permit it to straighten out and move under a guide 61 and over the upper surface 16 of the frame. The trip bar immediately returns to its normal position to guard against movement of the second uppermost mat with the one being fed.

At the completion of the feeding movement the feeding carriage 36 is returned to starting position by movement of the arms 46 in reverse direction. The beginning of reverse movement of the arms 46 causes the arms 41 to lift from the mat in its advanced position so that the return of the carriage does not disturb the mat. This swinging movement of the mat engaging arms upon return of the feeding carriage is limited by stops 63 on the carriage and cooperating with the arms. The pressure exerted on the top mat during feeding is regulated by springs 64 connected to the arms 43 and to the carriage 36.

The mat is fed from its advanced position over the surface 16 of the frame and to a position where it is applied to a battery plate. For this purpose the advanced mat is engaged adjacent its opposite lateral margins by grippers 66 adjustably mounted on a cross bar 67 secured at its ends to the swinging ends of levers 68. The other ends of the levers 68 are pivoted at 69 to slides 71 slidably mounted in slots 72 in the opposite sides of the frame. A second pair of levers 73 are pivoted respectively at one of their ends to the opposite ends of the cross bar 67 and are connected at their opposite ends to the upper ends of levers 74 fixed to a cross shaft 75 journaled in the frame. Intermediate their ends the levers 74 are connected by links 76 to slide blocks 77 mounted for sliding movement at opposite sides of the frame. Cam rollers 78 mounted on the blocks 77 engage the cam slots 49 to cause the slide blocks to be reciprocated upon rotation of the cam wheels 51 so that the levers 74 are moved back and forth.

The double link connection 68, 73 causes the lower ends of the grippers, which may be provided with sharp projections 81 as shown in Figure 8, to engage the mat upon the beginning of movement of the levers 74 in feeding direction. Upon continued movement of the levers 74 the mat is fed over the top surface of the frame between side guides 83 located in selected spaced position on the top surface.

At the completion of the movement of the levers 74 in feeding direction, the mat is in a position where its front edge is substantially at the location marked *a* in Figure 1, and where the whole length of the mat is located between the side guides 83. When the succeeding mat is advanced its forward edge abuts the rear edge of the mat between the side guides and pushes the latter mat into the dotted line position *b*. Here the first mat is positioned by a front stop 84 and by side registers 86. It is supported on a plate 90 having a central slot 91 located in alignment with the median line of the mat. After the first mat has been moved into this position the grippers 66 return to original position and release the second mat through the action of the double link connections 68, 73.

The first mat is now in position to be applied to a battery plate. The battery plates are fed to a position above the mat by means herein disclosed as a sprocket chain 92 passing over a sprocket wheel 93 which may be rotatably mounted on the frame. The plates are in upright position with their bottom edges resting on the pintles of the sprocket chain. The sprocket chain may constitute the means for delivering the plates from a pasting machine or other preliminary plate treating apparatus. A guide rail 94 is located above the sprocket chain and is arranged to engage the connecting lugs on the plates and maintain the plates in vertical position as they are moved by the chain. From the chain the plates move over a series of rollers 95 supported on the frame and onto a trip platform 96. The plates are fed onto the chain in such relation that there are always two or three plates on the end of the chain adjacent the trip platform so that the frictional engagement between these plates and the pintles of the chain urge the advance plate onto the trip platform.

Figures 3, 4:
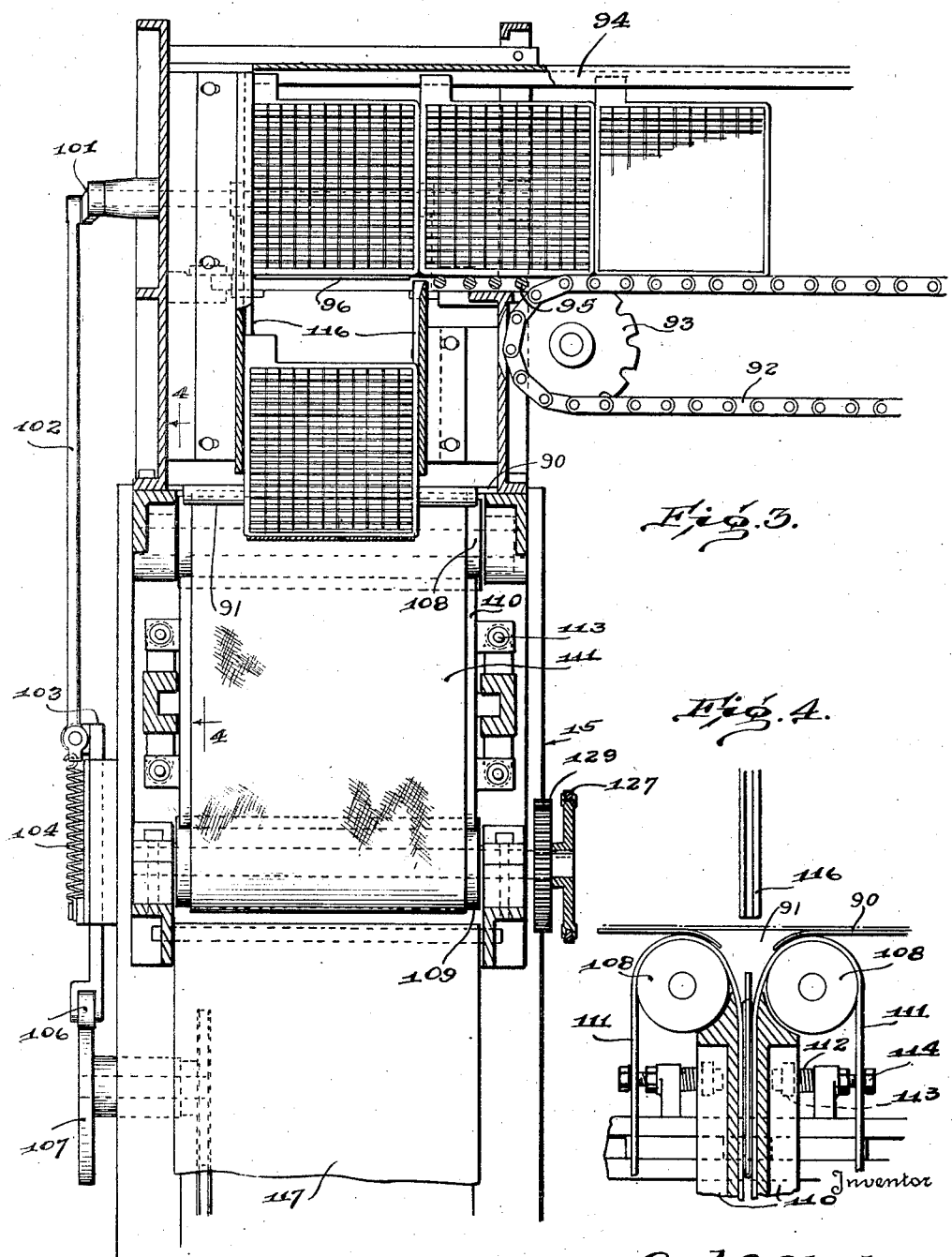
Figure 3 is a vertical cross-sectional view taken on the line 3—3 of Figure 1.
Figure 4 is an enlarged sectional view of a portion of the mat applying mechanism.

The trip platform is mounted at its ends for sliding movement in slots 97 in the frame and has connection at its opposite ends with levers 98 fixed to a cross shaft 99 journaled in the frame (Figure 1). An arm 101 fixed to the cross shaft has pivotal connection with a bar 102 connected at its lower end to a slide 103 slidably supported by the frame and urged by a spring 104 in a downward direction (Figure 3). The lower end of the slide 103 carries a cam roller 106 engaging a cam 107 carried by the outer end of a shaft journaled in the frame.

Coacting pressing means are located beneath the trip platform 96 and comprise a pair of endless belts 111 each passing about vertically aligned rolls 108, 109 so related that the inner flights of the belts 111 are spaced apart and located at opposite sides of the vertical plane of the battery plate on the trip platform. Pressure shoes 110 are located at the inside of the inner flights of the belts 111 to hold the belts toward each other in spaced relation. The shoes are urged inwardly toward each other by springs 112 and the inward movement of the shoes is limited by nuts 113 on the ends of adjustable mounting bolts 114.

After a plate has been moved into position on the trip platform 96, the cam 107 quickly retracts the platform 96 and permits the plate on the platform to fall through guides 116 onto the center of the mat and push the mat downwardly through the slot 91 in the plate 90 and into the space between the coacting belts 111 so that the mat is folded up over opposite faces of the plate as it moves into said space. As the belts feed the plate downwardly they press the mat into close contact with the plate under action of the springs 112 to cause the mat to be securely fixed to the plate. As the plates emerge from between the belts they slide over a chute 117 onto any suitable delivery means such as a conveyor 118.

The driving means for the machine may be of any suitable character as, for instance, an electric motor 121 connected by a belt 122 to drive a speed reduction unit 123. The speed reduction unit has driving connection with the shaft 34 carrying the cam wheel 51 by means of a belt 125, and with the shaft carrying the trip platform operating cam 107 by means of a belt 126. A belt 127 drivingly connects the speed reduction unit 123 and one of the shafts for the rolls 109. This shaft carries a gear 129 (see Figure 3) that meshes with a gear 130 on the shaft for the other roll 109, thereby causing both belts 111 to move synchronously.

If the plates are fed to the present apparatus directly from the pasting machine, the still wet paste may be sufficient to cement the mats to the plate. If this is not the case, suitable sprays may be provided to apply an adhesive either to the plates as they are in position on the trip platform or as they move into position thereon. Alternatively, mat engaging rolls may be provided above the upper surface of the frame to apply adhesive to the mats as they are fed to the applying station.

Figure 9 illustrates a modified arrangement of the present apparatus for feeding mats from coils of the mat in the form of continuous webs. In this form of the invention coils or rolls of a fibrous glass web may be supported on brackets 141 extending from the frame, and the web, as it is unwound from the roll, passes beneath a pressure roll 142 above the top surface of the frame and beneath the grippers as in the preferred form of the invention. The grippers feed the web to the applying station in the same manner as the separate mats are fed in the preferred form. At the applying station the advance portion of the web is cut off to form a single mat by a suitable shear suitably actuated.

Various modifications may be made within the spirit and scope of the appended claims.

I claim:

1. In apparatus for applying sheets to opposite faces of battery plates, the combination of a supporting frame having a sheet supporting surface, an opening through said surface, a support for a battery plate above said surface in line with said opening, means for feeding a battery plate into vertical position on said support, a support for a stack of sheets at one end of said sheet supporting surface, means for feeding a sheet from said stack onto said surface, grippers movable along said supporting surface and having roughened faces for engaging the upper face of said sheet and feeding it to a position centrally over the opening in said sheet supporting surface, and means for releasing said plate from said plate support whereby it drops by gravity onto the sheet and forces the sheet through said opening to fold the sheet upwardly about opposite faces of the plate.

2. In apparatus for applying sheets to opposite sides of battery plates, the combination of a supporting frame having a sheet supporting surface, an opening through said surface, a support for a battery plate above said surface in line with said opening, means for feeding a battery plate into vertical position on said support, means for supporting a stack of sheets to be applied to battery plates, a movable abutment at the advance end of the sheets in said stack and in the path of feeding movement of the sheets from the stack, means for moving a sheet from said stack relative to and against said abutment whereby the sheet is bulged up from the stack and separated from the other sheets in the stack, means for moving said abutment out of the path of said sheet after a predetermined period to permit said sheet to straighten out and move as a whole in feeding direction, means for moving said sheet to a position centrally over the opening in the supporting surface on the frame, and means for releasing said plate from said plate support whereby it drops by gravity onto the sheet and forces the sheet through said opening to fold the sheet upwardly about opposite sides of the plate.

3. In apparatus for applying sheets to opposite faces of battery plates, the combination of a supporting frame having a sheet supporting surface, an opening through said surface, a support for a battery plate above said surface in line with said opening, means for feeding a battery plate into vertical position on said support, means for supporting a stack of sheets to be applied to battery plates, a movable abutment at the advance end of the sheets in said stack and in the path of feeding movement of the sheets from the stack, means for moving a sheet from said stack relative to and against said abutment whereby the sheet is bulged up from the stack and separated from the other sheets in the stack, means for moving said abutment out of the path of said sheet after a predetermined period to permit said sheet to straighten out and move as a whole in feeding direction, sheet-engaging elements movable along said sheet supporting surface for moving said sheet to a position centrally over the opening in the supporting surface on the frame, and means for releasing said plate from said plate support whereby it drops by gravity onto the sheet and forces the sheet through said opening to fold the sheet upwardly about opposite sides of the plate.

4. In apparatus for applying sheets to opposite faces of battery plates, the combination of a supporting frame having a sheet supporting surface, an opening through said surface, a support for a battery plate above said surface in line with said opening, a support for a stack of sheets at one end of said sheet supporting surface, means for feeding a sheet from said stack onto said surface, grippers movable along said supporting surface and adapted to engage the said sheet and feed it to a position centrally over the opening in said sheet supporting surface, and means for releasing said plate from said plate support whereby it drops by gravity onto the sheet and forces the sheet through said opening to fold the sheet upwardly about opposite faces of the plate.

CARL G. STAELIN.